United States Patent [19]

Manriquez

[11] 3,964,833

[45] June 22, 1976

[54] KEYED RETAINER

[75] Inventor: Ralph F. Manriquez, San Jose, Calif.

[73] Assignee: The Singer Company, New York, N.Y.

[22] Filed: May 21, 1975

[21] Appl. No.: 579,344

[52] U.S. Cl. .............................. 403/357; 403/318
[51] Int. Cl.² ........................................ F16D 1/06
[58] Field of Search ........... 403/357, 356, 155, 318, 403/355; 151/8, 6; 85/8.3

[56] References Cited
UNITED STATES PATENTS

| 2,213,884 | 9/1940 | Ohmart | 403/155 X |
| 2,434,935 | 1/1948 | Kroon | 403/355 X |
| 2,661,228 | 12/1953 | Wilson | 403/155 |
| 3,561,799 | 2/1971 | Hutchinson | 403/356 |
| 3,703,305 | 11/1972 | Wise et al. | 403/357 |

*Primary Examiner*—Andrew V. Kundrat
*Attorney, Agent, or Firm*—Edward L. Bell; Joseph R. Dwyer

[57] ABSTRACT

A means for coupling a sleeve or hub to a shaft utilizing a spring retaining clip having a centrally located resilient loop whose diameter is slightly larger than the diameter of a blind locating hole formed in the shaft. The spring retaining clip is provided with oppositely extending arms which engage a longitudinal keyway in the sleeve and the ends of the arms retain the sleeve longitudinally of the shaft.

3 Claims, 6 Drawing Figures

U.S. Patent   June 22, 1976   3,964,833
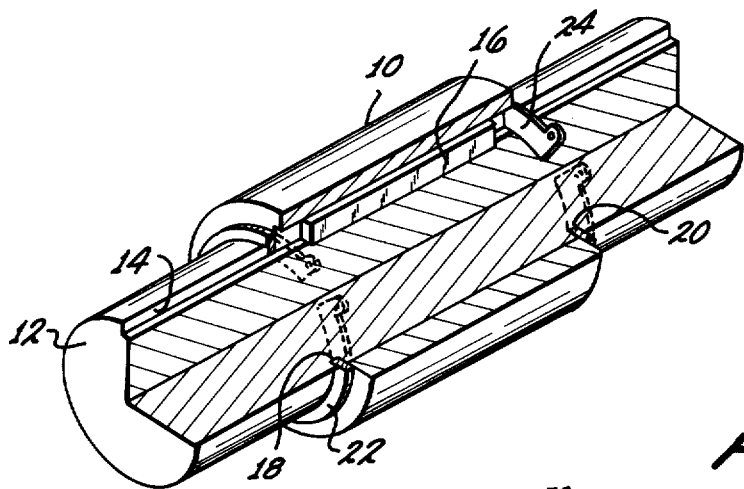
FIG. 1 PRIOR ART
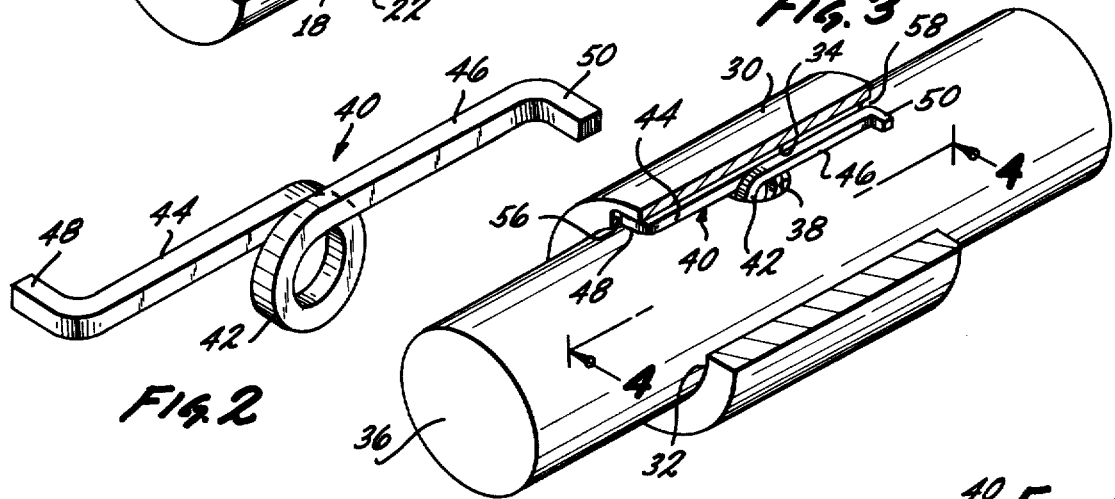
FIG. 2
FIG. 3
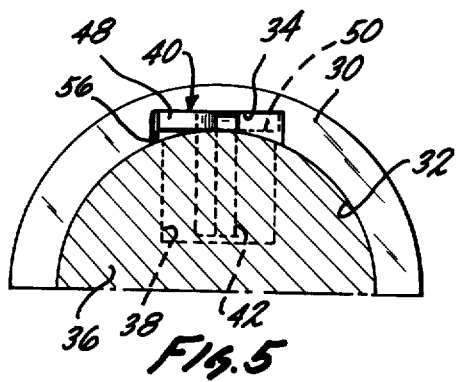
FIG. 5
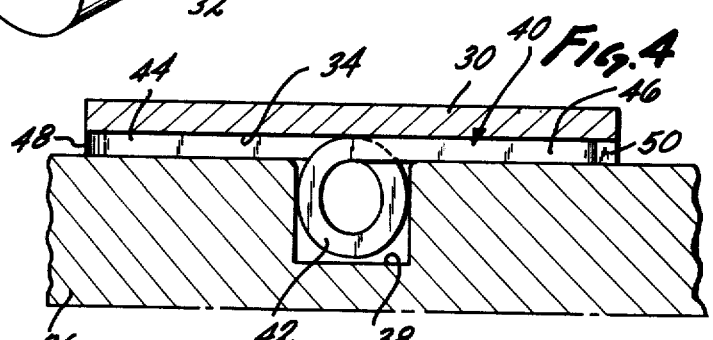
FIG. 4
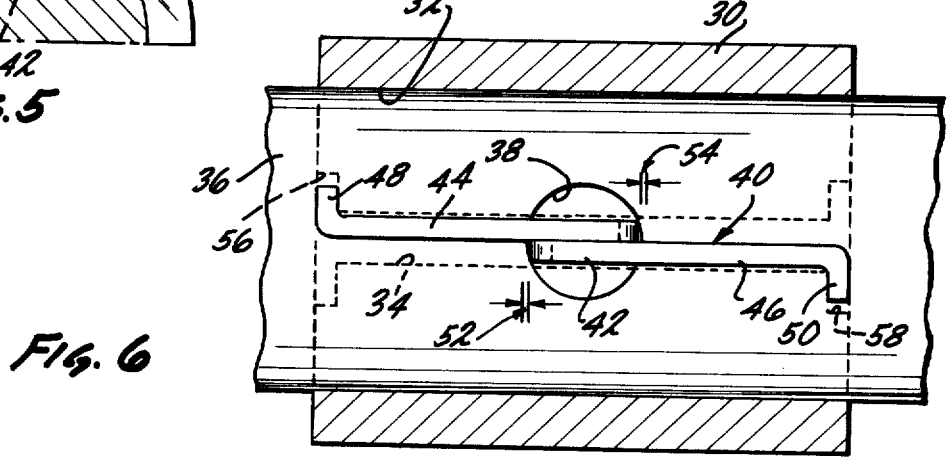
FIG. 6

3,964,833

KEYED RETAINER

BACKGROUND OF THE INVENTION

This invention relates to rotatable drive shafts with hubs or sleeves coupled thereto, and particularly to a new and improved means of mechanically coupling a sleeve to a drive shaft in driving relationship in both the circumferential and lateral directions and is more specifically directed to the coupling of a sleeve utilized in a spring-type one-way clutch to a drive shaft.

DESCRIPTION OF THE PRIOR ART

The conventional way of mechanically coupling a drum or sleeve to a rotatable drive shaft is to provide the shaft with a longitudinal slot or keyway parallel to the shaft axis which complements a similar keyway in the bore of the drum or sleeve and to insert a key so as to span both keyways and thus couple the sleeve and shaft together preventing relative rotation therebetween. Then, to retain the sleeve laterally of the shaft, the shaft is also provided with annular grooves spaced apart the length of the sleeve into which C-rings are placed so as to engage the ends of the sleeve. Thus, this arrangement requires, in addition to the longitudinal keyway, two additional annular retaining grooves cut in the shaft for adequate retention of the sleeve on the shaft.

One disadvantage in the cutting of the longitudinal keyway in the shaft is that it is difficult to maintain the shaft straight during hardening, since there is a tendency for the shaft to buckle in the direction of the keyway during the heat-treating process. Non-uniform stresses introduced into the shaft by the cutting of the keyway react during the hardening process.

Additionally, the annular retaining grooves cut in the shaft to receive the C-rings must be held to very close tolerances, viz, to within ± 0.002 so that the C-rings function properly. For example, for the use of a half inch shaft, the depth of the annular groove is 0.045 ± 0.003 and the width must be kept to 0.039 + 0.003 − 0.000. Thus, considering that there must be two such annular grooves for each sleeve to receive two C-rings, the cost of such a machining operation is excessive.

Another disadvantage in the present method of coupling a drum to a shaft is the fact that the use of C-rings requires a special tool to insert the C-rings into the annular grooves, and the removal of such C-rings is difficult since they are of spring steel. The removal tool must overcome the resiliency of the C-rings to snap them out of the groove. During this step, the C-rings are often lost since they snap out of the grooves with considerable force and speed.

SUMMARY OF THE INVENTION

It is an object of this invention to reduce the cost of manufacture of the means for coupling a sleeve or hub to the shaft yet maintain the functions of the prior art arrangements.

The foregoing object is accomplished by eliminating the longitudinal keyway in the shaft and by eliminating the need for C-rings. Yet, on the other hand, providing the shaft with a simple blind locating hole held to loose tolerances and utilizing a specially constructed spring retaining clip. This spring retaining clip has a centrally located resilient loop whose diameter is slightly larger than the diameter of the blind locating hole, which is placed in the locating hole with its arms oriented lengthwise of the shaft. While in this position, a sleeve with the conventional keyway is slid over the arms of the clip and positioned so that the blind hole is substantially mid-way of the hub and in this position, holds the spring loop within the blind hole. The oppositely extending arms of the retaining clip are also provided with bent ends or tabs which spring into position on each end of the sleeve once the sleeve is in location. Using the retaining clip with the spring loop held in the blind hole, the ends functioning to hold the sleeve longitudinally of the shaft and with the oppositely extending arms within the sleeve keyway, the sleeve is held in driving relationship on the shaft.

In addition to the simplicity of the above described sleeve and shaft coupling means and its ease of assembly, this arrangement has the additional advantage over the prior art in its ease of disassembly. To remove the sleeve, it is simply necessary to use a conventional screw driver or any tool which can move one of the tabs of the retaining clip back toward the sleeve keyway and to slide the sleeve at the same time, whereupon the sleeve may be removed from the shaft since the moved tab will travel freely on the keyway. This constrasts with the prior art device, which requires a special tool to remove the C-rings which are often lost because they snap out with a spring type action.

Accordingly, it is an additional object of this invention to provide a means for coupling and decoupling a sleeve to and from a shaft without the need for special tooling.

Another advantage of the invention is that the center of the blind hole, which can be very accurately located laterally of the shaft, viz, to within ± 0.005 yet the diameter can have a loose tolerance of ± 0.010. This is due to the fact that any lack of tolerance in the hole size is taken up by the loop of the spring retainer.

BRIEF DESCRIPTION OF THE DRAWINGS

FIG. 1 is a perspective view of a shaft and sleeve illustrative of the prior art, partially cut away to show the details thereof;

FIG. 2 is a perspective view of the retainer clip forming the means of retaining a sleeve to a drive shaft;

FIG. 3 is a perspective view of a shaft and sleeve with the retaining ring inserted therein partially cut away to illustrate the working details thereof;

FIG. 4 is a sectional view taken along line 4—4 of FIG. 3;

FIG. 5 is a cross-sectional view of the invention taken along line 4—4 and looking in the direction of the arrows; and FIG. 6 is a top view enlarged and cut away to show the details of the invention more clearly.

BRIEF DESCRIPTION OF THE PREFERRED EMBODIMENT

Turning now to the drawings, it can be seen that in FIG. 1 the prior art coupling of a sleeve 10 to a drive shaft 12 comprises machining a keyway 14 longitudinally of the shaft to receive a key 16 and matching two annular grooves 18 and 20 spaced-apart to receive a pair of C-rings 22 and 24 which engage the ends of the sleeve. For the reason set forth above, such a method of coupling is not only difficult and costly to manufacture, but difficult to assemble and disassemble.

Turning now to FIGS. 2–6, it can be seen that the present invention utilizes a sleeve 30 having a bore 32 and a keyway 34, which sleeve slips over a shaft 36.

The shaft 36 is provided with a blind hole 38 which can be very closely located relative to the end of the shaft but whose diameter tolerance can be large as compared to the tolerance requirements of the keyway and peripheral grooves of the prior art as discussed supra. The sleeve 30 is maintained on the shaft 36 by a retaining clip 40 which, in the embodiment disclosed, is formed of a length of spring wire to have a centrally located loop 42, the diameter of which is slightly larger than the diameter of the blind hole 38. The formation of the loop 42 provides the retaining clip with a pair of oppositely extending arms 44 and 46 which terminate in oppositely directed tabs or flanges 48 and 50 directed normal to the plane of the loop. These tabs are also defined short enough to pass through the keyway 34 of the sleeve.

To couple the sleeve 30 to the shaft 36, it is simply necessary first to insert the retainer clip loop 42 into the blind hole 38, which will remain in place during this assembly step because of the reaction of the slightly oversized loop against the sidewall of the blind hole. See the arrows indicating such oversize at 52 and 54 in FIG. 6. With the arms 44 and 46 oriented longitudinally of the shaft, the keyway 34 will accept the arms 44 and 46 and one of the tabs 48 or 50 which is initially inserted in the keyway and allow the sleeve to be slid into position. The resiliency of the retaining clip allows the selected tab and the arms to adjust to the keyway 34. When the sleeve is in position relative to the retaining clip, the tabs will spring out into slots 56 and 58 formed in the end walls of the sleeve to thus lock the sleeve in place.

As distinguished from the complex method of removing the sleeves in the prior art, in this arrangement, it is simply necessary to move one of the tabs 48 or 50 from its locked position so that it will be properly oriented with respect to the keyway and concurrently then move the keyway along the shaft. No special tools are required. A conventional screwdriver or any other object which will move the one tab is all that is required.

While there is shown only one blind hole and one coupling arrangement, in the practical embodiment of this invention where the sleeve is a drum about which the spring of a one-way clutch arrangement is wound, and as a consequence, there are several such blind holes and coupling arrangements in any one shaft. However, the concept of this invention is the same in all instances.

It should be pointed out that while in the embodiment disclosed, the sleeve is provided with slots 56 and 58 formed in the end walls, such slots do not add any significance to the cost of this coupling, since the sleeve is normally of sintered material, such as a nickel-steel alloy, so that in the formation of the part, the addition of the slots to the cost of manufacture of the sleeve is insignificant. Furthermore, the slots receive the tabs so that a plurality of sleeves could be stacked contiguously without interference from the tabs but if such stacking is not a requirement, then the slots could be omitted without any loss of function of the tabs.

Finally, while reference has always been made to a drive shaft and drive sleeve, the device will work in reverse; the sleeve can be used to drive the shaft utilizing the concept of the invention.

What is claimed is:

1. A means for coupling a sleeve in driving relationship to a shaft comprising:
    a blind hole in said shaft,
    longitudinal keyway means in said sleeve,
    a spring means of substantially uniform cross-section comprising loop means formed centrally thereof insertable in said blind hole and provided with a pair of oppositely extending arms disposable in said keyway means, and
    preformed tab means on said arms arranged to extend generally tangentally of the circumference of said shaft,
    said keyway means being of a width sufficient to receive said tab means to permit disposition of said arms and tab means between said shaft and sleeve and to permit removal thereof without destruction,
    said loop means, when inserted in said blind hole couple said sleeve and shaft circumferentially and said tab means engaging said sleeve, together with said loop means, position said sleeve longitudinally on said shaft.

2. The coupling means as claimed in claim 1 wherein said loop means is oversize with respect to blind hole to compensate for any large tolerances in said blind hole.

3. The coupling means as claimed in claim 1 wherein said sleeve has slots therein to receive said tab means when said sleeve is positioned on said shaft.

* * * * *